United States Patent
Kao

(10) Patent No.: US 7,833,066 B2
(45) Date of Patent: Nov. 16, 2010

(54) EARPHONE JACK DEVICE AND PORTABLE ELECTRONIC DEVICE EMPLOYING THE SAME

(75) Inventor: Ming-Wei Kao, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 12/543,645

(22) Filed: Aug. 19, 2009

(65) Prior Publication Data

US 2010/0240260 A1    Sep. 23, 2010

(51) Int. Cl.
*H01R 24/04* (2006.01)
(52) U.S. Cl. ...................................... 439/668
(58) Field of Classification Search ................. 439/668, 439/669
See application file for complete search history.

(56) References Cited

U.S. PATENT DOCUMENTS 7,664,996 B2 *  2/2010  Matsuo et al. ................ 714/48
2004/0121802 A1 *  6/2004  Kim et al. ................. 455/556.2
2005/0143146 A1 *  6/2005  Kim ............................ 455/574
2006/0038622 A1 *  2/2006  Choe et al. ..................... 331/74
2008/0284508 A1 * 11/2008  Walker et al. .................. 330/10
2009/0161588 A1 *  6/2009  Maldonado et al. ......... 370/311
2009/0237854 A1 *  9/2009  Mok et al. .................... 361/111

* cited by examiner

*Primary Examiner*—Javaid Nasri
(74) *Attorney, Agent, or Firm*—Steven M. Reiss

(57) ABSTRACT

A portable electronic device includes an earphone jack device for connecting a plug of an earphone and a main circuit board. The main circuit board includes an audio signal processor module connected to the earphone jack device, an MSM module connected to the audio signal processor module, and a PMIC module connected to the earphone jack device. The MSM module generates a first bias voltage inputted into the audio signal processor module to actuate the audio signal processor module to play audio signals, and the PMIC module generates a second bias voltage inputted to the earphone jack device to actuate the earphone connected to the earphone jack device.

16 Claims, 3 Drawing Sheets

EARPHONE JACK DEVICE AND PORTABLE ELECTRONIC DEVICE EMPLOYING THE SAME

BACKGROUND

1. Technical Field

The present disclosure relates to earphone jack devices and portable electronic devices employing the same, and particularly to an earphone jack device capable of decreasing undesirable noise and a portable electronic device employing the same.

2. Description of Related Art

Many portable electronic devices, such as mobile phones, CD players, and MP3 players, can play audio files. Most of these portable electronic devices have earphone jacks. Referring to FIG. 3, a conventional portable electronic device 100 capable of playing audio files generally includes a main circuit board 1 and an earphone jack device 2. The main circuit board 1 includes an audio signal processor module 11, an audio signal receiver 13, and a mobile station modem (MSM) module 15. The MSM module 15 includes a bias voltage interface 151. The bias voltage interface 151, the audio signal receiver 13, the audio signal processor module 11, and the earphone jack device 2 are electronically connected in that order, and the earphone jack device 2 is also directly electronically connected to the bias voltage interface 151.

When a plug 3 of an earphone is inserted into and electronically connected to the earphone jack device 2, the MSM module 15 generates a bias voltage. The bias voltage is input to the audio processor module 11 via the audio signal receiver 13 to actuate the signal processor module 11, and is also input to the plug 3 to actuate the earphone. Thus, audio files are received by the audio signal receiver 13 from the main circuit board 1, and are further transmitted to the audio processor module 11 to be played. The played audio signals are then transmitted to the earphone via the earphone jack device 2.

When the portable electronic device 100 is used to engage in a phone call or is playing audio files by its own speaker (not shown), the MSM module 151 also generates the bias voltage to actuate the audio signal processor module 11. If the plug 3 is inserted into and electronically connected to the earphone jack device 2 when the bias voltage already exists in the portable electronic device 100, the bias voltage may be suddenly changed by the insertion operation of the plug 3, and an instantaneous pulse electric potential may be generated. The pulse electric potential can cause a popping noise in the portable electronic device 100 and the earphone, and even damage the portable electronic device 100 and the earphone.

Therefore, there is room for improvement within the art.

BRIEF DESCRIPTION OF THE DRAWINGS

Many aspects of the present earphone jack device and portable electronic devices employing the same can be better understood with reference to the following drawings. The components in the various drawings are not necessarily drawn to scale, the emphasis instead being placed upon clearly illustrating the principles of the present earphone jack device and portable electronic devices employing the same. Moreover, in the drawings, like reference numerals designate corresponding parts throughout the figures.

DETAILED DESCRIPTION

Figure 1:
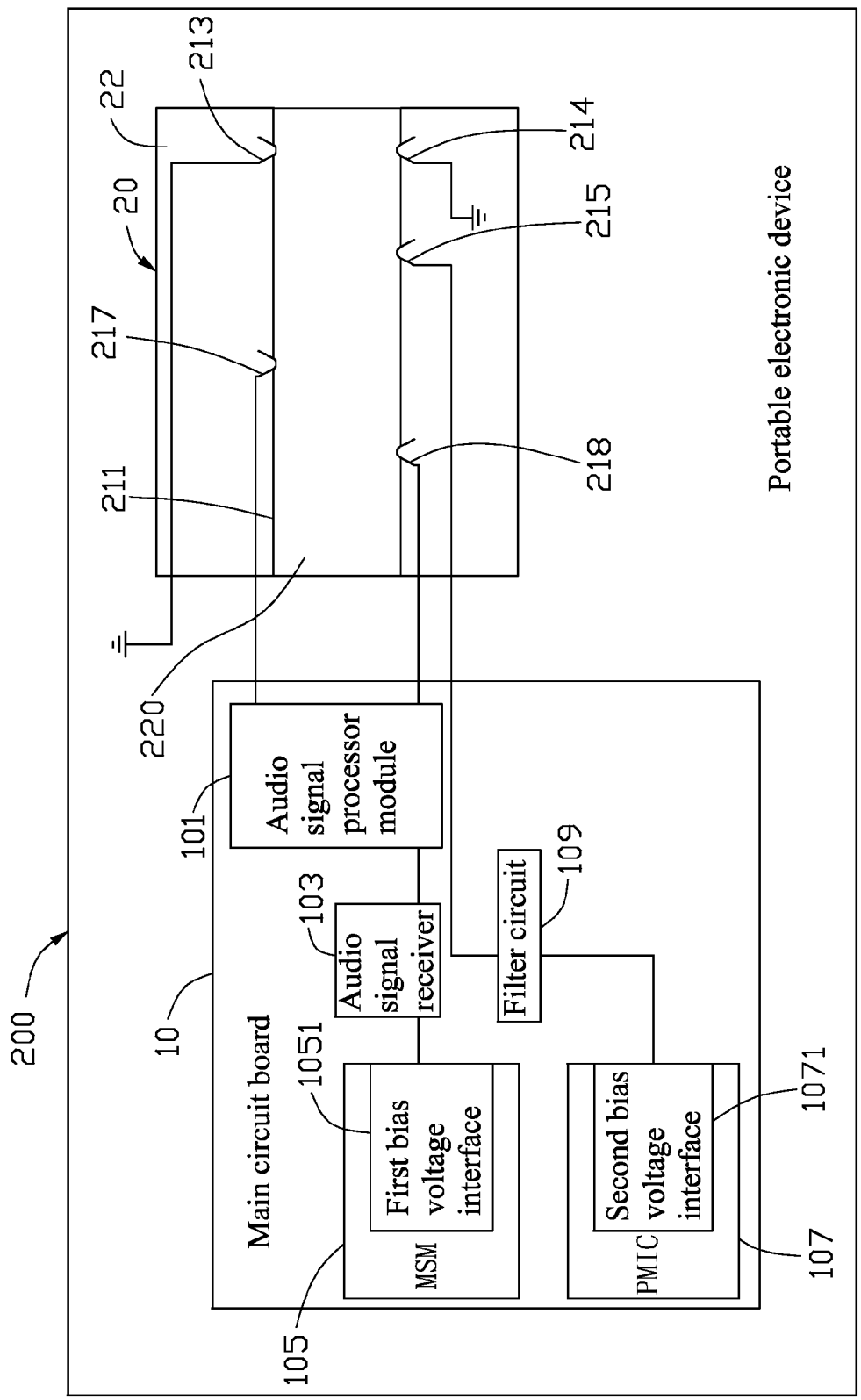
FIG. 1 is a block diagram of a portable electronic device, according to an exemplary embodiment.

Referring to FIG. 1, a portable electronic device 200 according to an exemplary embodiment is shown. The portable electronic device 200 can play audio files and send audio signals to earphones electronically connected thereto. The portable electronic device 200 can be a mobile phone, a CD player, an MP3 player, a radio, a personal computer, etc.

The portable electronic device 200 includes a main circuit board 10 and an earphone jack device 20. The main circuit board 10 includes an audio processor module 101, an audio signal receiver 103, a mobile station modem (MSM) module 105, a power management integrated circuit (PMIC) module 107, and a filter circuit 109. The MSM module 105 includes a first bias voltage interface 1051, and the PMIC module 107 includes a second bias voltage interface 1071. The first bias voltage interface 1051, the audio signal receiver 103, and the audio processor module 101 are electronically connected in series. The filter circuit 109 is electronically connected to the second bias voltage interface 1071.

The earphone jack device 20 includes a housing 22 installed in the portable electronic device 200. Understandably, the housing 22 can be a part of the housing of the portable electronic device 200. The housing 22 defines a jack hole 220 to receive earphone plugs. The earphone jack device 20 further includes at least five connectors 213, 214, 215, 217, 218, which are all made of elastic materials. The connectors 213, 214, 215, 217, 218 are all mounted in the housing 22 and extend into the jack hole 220. When a plug is received in the jack hole 220, the connectors 213, 214, 215, 217, 218 are compressed outwardly such that the connectors 213, 214, 215, 217, 218 are in tight contact with the plug to form electronic connections with the plug and fix the plug in the jack hole 220. The connectors 213, 214 are grounded. The connector 215 is electronically connected to the filter circuit 109. The connectors 217, 218 are connected to the audio signal processor 101.

Figure 2:
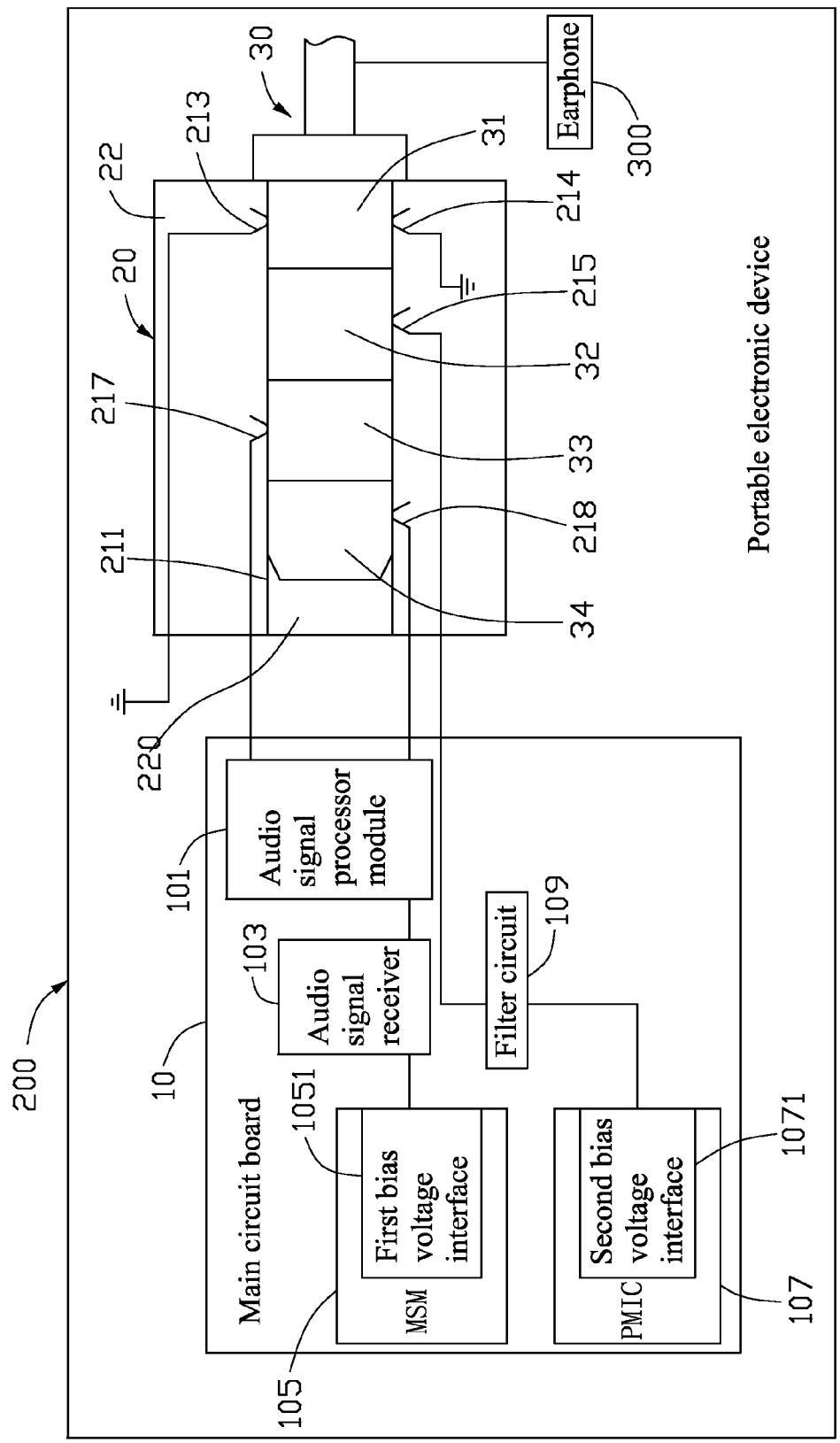
FIG. 2 is a schematic view of the portable electronic device shown in FIG. 1, connected to an earphone plug.
Figure 3:
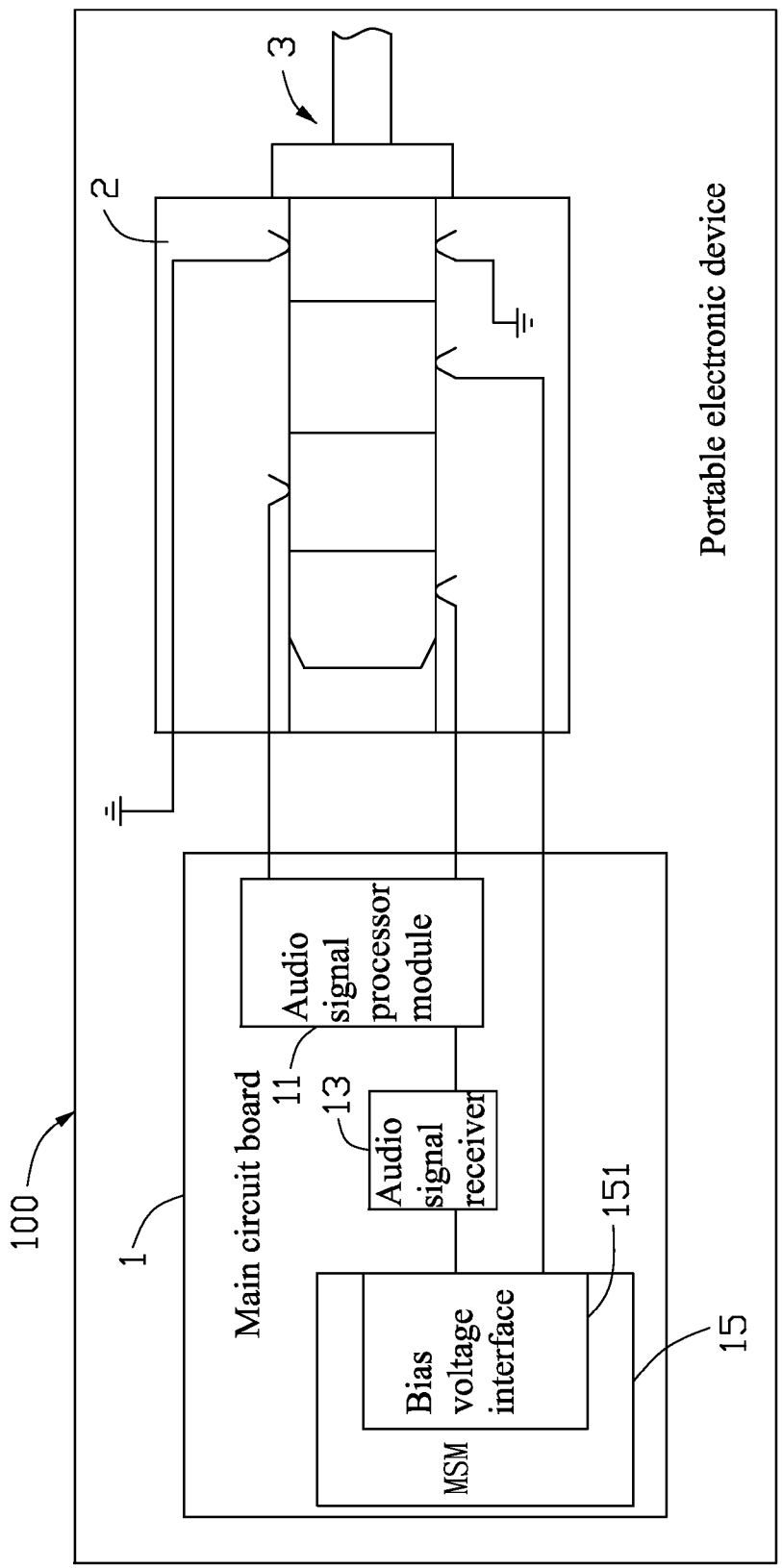
FIG. 3 is a schematic view a conventional portable electronic device connected to an earphone plug.

Also referring to FIG. 2, a conventional earphone 300 can be connected to the portable electronic device 200 to receive audio signals from the portable electronic device 200. The earphone 300 includes a plug 30 configured for being inserted into the jack hole 220 and electronically connected to the portable electronic device 200. The plug 30 has a plurality of conductive areas formed thereon, which include at least a grounding portion 31, an actuating portion 32, and two sound channel connecting portions 33, 34 respectively corresponding to the left and right sound channels of the earphone 300. When the plug 30 is inserted into the jack hole 220, the grounding portion 31 can contact the connectors 213, 214, the actuating portion 32 can contact the connector 215, and the sound channel connecting portions 33, 34 can respectively contact the connectors 217, 218.

When the portable electronic device 200 is used to engage a phone call or play audio files, the MSM module 105 generates a first bias voltage, which is input to the audio signal processor module 101 (e.g., via the audio signal receiver 103) to actuate the audio signal processor module 101. Audio files are received by the audio signal receiver 103 from the main circuit board 10, and are further transmitted to the audio processor module 101 to be played. The PMIC module 107 detects if a plug of an earphone, such as the plug 30, is inserted into the jack hole 220 and contacts the connector 215. If there is no plug inserted in the jack hole 220 and contacting the connector 215, the PMIC module 107 does not generate the second bias voltage.

When the earphone 300 is used, the plug 30 is inserted into the jack hole 220. The grounding portion 31 is in contact with the connectors 213, 214 to provide grounding to the earphone 300. The actuating portion 32 is in contact with the connector 215 to be electronically connected to the connector 215, and the sound channel portions 33, 34 are respectively in contact with the connectors 217, 218 to be electronically connected to the connector 217, 218. When the PMIC module 107 detects the inserted and correctly connected plug 30 via the connector 215 and the filter circuit 109, the PMIC module 107 generates a second bias voltage, which is input to the earphone 300 via the filter circuit 109 and the connector 215, thus the earphone 300 is actuated to work. Audio signals played by the audio signal processor module 101 are respectively transmitted to the left and right sound channels of the earphone 300 via the connectors 217, 218.

In the portable electronic device 200, the audio processor module 101 and the earphone 300 are respectively actuated by the first bias voltage generated by the MSM module 105 and the second bias voltage generated by the PMIC module 107. The first bias voltage is not input to the earphone 300, and thus is not influenced by the plug 30.

Further, the PMIC module 107 only generates the second bias voltage after it detects that the plug 30 is inserted into the jack hole 220 and correctly connected to the earphone jack device 10. Thus, the insertion operation of the plug 30 cannot suddenly change the second bias voltage. In this way, the portable electronic device 200 prevents instantaneous pulse electric potentials being generated therein, and then both the portable electronic device 200 and the earphone 300 connected thereto can be protected from popping noise and damage caused by the pulse electric potentials.

Understandably, besides the earphone 300, the earphone jack device 20 can also be electronically connected to other compatible devices. Either one of the connectors 217, 218 can be omitted if not needed. The filter circuit 109 can also be omitted if desired.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An earphone jack device used in a portable electronic device, comprising:
   a housing defining a jack hole to receive a plug of an earphone; and
   a plurality of connectors mounted in the housing and extending into the jack hole such that the plug received in the jack hole is in contact with the connectors to form electronic connections; wherein at least one connector is connected to an audio signal processor module of the portable electronic device to transmit audio signals to the plug when the audio signal processor module is actuated by a first bias voltage generated by a mobile station modem (MSM) module, a connector is connected to a power management integrated circuit (PMIC) module to transmit a second bias voltage generated by the PMIC module to actuate the earphone, and at least one connector is grounded.

2. The earphone jack device as claimed in claim 1, wherein the earphone jack device transmits the second bias electric potential to the plug to actuate the earphone when the plug is in contact with the plurality of connectors.

3. The earphone jack device as claimed in claim 1, wherein two connectors are connected to the audio signals processor module of the portable electronic device respectively correspond to left and right sound channels of the earphone.

4. The earphone jack device as claimed in claim 1, wherein the connectors are made of elastic materials.

5. A portable electronic device, comprising:
   an earphone jack device for connecting a plug of an earphone; and
   a main circuit board including an audio signal processor module connected to the earphone jack device, a mobile station modem (MSM) module connected to the audio signal processor module, and a power management integrated circuit (PMIC) module connected to the earphone jack device; wherein the MSM module generates a first bias voltage inputted into the audio signal processor module to actuate the audio signal processor module to play audio signals, the PMIC module generates a second bias voltage inputted to the earphone jack device to actuate the earphone connected to the earphone jack device, and the audio signals played by the audio processor module are transmitted to the earphone through the plug.

6. The portable electronic device as claimed in claim 5, further comprising an audio signal receiver connected between the MSM module and the audio signal processor module for receiving audio files from the main circuit board and transmitting the audio files to the audio signal processor module to play.

7. The portable electronic device as claimed in claim 6, wherein the earphone jack device includes a connector connected to the audio signal processor module for transmitting audio signals to the earphone.

8. The portable electronic device as claimed in claim 6, wherein the earphone jack device includes two connectors respectively corresponding to left and right sound channels of the earphone and connected to the audio signal processor module for respectively transmitting audio signals to the left and right sound channels of the earphone.

9. The portable electronic device as claimed in claim 5, further comprising a filter circuit connected between the PMIC module and the earphone jack device.

10. The portable electronic device as claimed in claim 9, wherein the earphone jack device includes a connector connected to the filter circuit to input the second bias voltage to the earphone jack device to actuate the earphone connected to the earphone jack device.

11. The portable electronic device as claimed in claim 5, wherein the PMIC module generates the second bias voltage when the plug connected to the earphone jack device is detected.

12. A portable electronic device, comprising:
   an earphone jack device for connecting a plug of an earphone; and
   a main circuit board including an audio signal processor module connected to the earphone jack device, a mobile station modem (MSM) module connected to the audio signal processor module, and a power management integrated circuit (PMIC) module connected to the earphone jack device; wherein the MSM module generates a first bias voltage without being influenced by the plug, the first bias voltage input into the audio signal processor module to actuate the audio signal processor module to play audio signals; when the plug connected to the earphone jack device, the PMIC module generates a second bias voltage input to the plug through the earphone jack device to actuate the earphone, and the audio signals played by the audio processor module are transmitted to the earphone through the plug.

13. The portable electronic device as claimed in claim 12, further comprising an audio signal receiver connected between the MSM module and the audio signal processor module for receiving audio files from the main circuit board and transmitting the audio files to the audio signal processor module to play.

14. The portable electronic device as claimed in claim 13, wherein the earphone jack device includes at least one connector connected to the audio signal processor module for transmitting audio signals to the earphone.

15. The portable electronic device as claimed in claim 14, further comprising a filter circuit connected between the PMIC module and the earphone jack device.

16. The portable electronic device as claimed in claim 15, wherein the earphone jack device includes a connector separated from the at least one connector connected to the audio signal processor module and connected to the filter circuit to input the second bias voltage to the earphone jack device to actuate the earphone connected to the earphone jack device.

* * * * *